United States Patent
Cumbo

(10) Patent No.: US 10,480,221 B2
(45) Date of Patent: Nov. 19, 2019

(54) ILLUMINATED VIRTUAL HANDLE FOR POWER DOOR SYSTEM IN MOTOR VEHICLES

(71) Applicant: MAGNA CLOSURES INC., Newmarket (CA)

(72) Inventor: Francesco Cumbo, Pisa (IT)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 16/038,330

(22) Filed: Jul. 18, 2018

(65) Prior Publication Data

US 2019/0024421 A1    Jan. 24, 2019

Related U.S. Application Data

(60) Provisional application No. 62/534,801, filed on Jul. 20, 2017.

(51) Int. Cl.

| | |
|---|---|
| *E05B 81/76* | (2014.01) |
| *B60R 25/24* | (2013.01) |
| *B60R 25/23* | (2013.01) |
| *B60Q 1/00* | (2006.01) |
| *B60Q 1/26* | (2006.01) |
| *G07C 9/00* | (2006.01) |
| *E05C 17/00* | (2006.01) |
| *B60Q 1/50* | (2006.01) |
| *E05F 15/00* | (2015.01) |
| *E05B 17/10* | (2006.01) |
| *E05F 15/611* | (2015.01) |
| *E05F 15/73* | (2015.01) |
| *E05F 15/76* | (2015.01) |

(52) U.S. Cl.
CPC ............ *E05B 81/76* (2013.01); *B60Q 1/0011* (2013.01); *B60Q 1/2669* (2013.01); *B60Q 1/50* (2013.01); *B60R 25/241* (2013.01); *E05B 17/10* (2013.01); *E05C 17/003* (2013.01); *E05C 17/006* (2013.01); *E05F 15/00* (2013.01); *E05F 15/611* (2015.01); *E05F 15/73* (2015.01); *E05F 15/76* (2015.01); *G07C 9/00174* (2013.01); *G07C 9/00309* (2013.01); *B60R 25/23* (2013.01); *E05Y 2400/858* (2013.01); *E05Y 2900/531* (2013.01); *G07C 2209/62* (2013.01)

(58) Field of Classification Search
CPC ...... B60Q 1/0011; B60Q 1/2669; B60Q 1/50; B60R 25/23; B60R 25/241; E05B 17/10; E05B 81/76; E05C 17/003; E05C 17/006; E05F 15/00; G07C 2209/62; G07C 9/00174; G07C 9/00309
USPC ....................................................... 340/5.72
See application file for complete search history.

(56) References Cited

U.S. PATENT DOCUMENTS

| | | | |
|---|---|---|---|
| 2007/0203688 A1* | 8/2007 | Fuji .................. | G06F 17/28 704/2 |
| 2010/0321946 A1* | 12/2010 | Dingman ............ | B60Q 1/2665 362/501 |
| 2013/0130674 A1 | 5/2013 | De Wind et al. | |

(Continued)

*Primary Examiner* — Yong Hang Jiang
(74) *Attorney, Agent, or Firm* — Dickinson Wright PLLC

(57) ABSTRACT

A closure system for a handleless door of a motor vehicle equipped with a power release latch assembly, a power opening presenter assembly, and an illumination assembly configured to illuminate a grasp area (virtual handle) of the handleless door upon the handleless door being moved to a partially-open position via the power opening presenter assembly.

19 Claims, 10 Drawing Sheets

(56) References Cited

U.S. PATENT DOCUMENTS

2014/0000165 A1* 1/2014 Patel ..................... E05B 81/76
                                                    49/31
2017/0052270 A1    2/2017  Schatz et al.
2017/0292310 A1   10/2017  Podkopayev
2018/0038147 A1*  2/2018  Linden ................. E05F 15/616

* cited by examiner

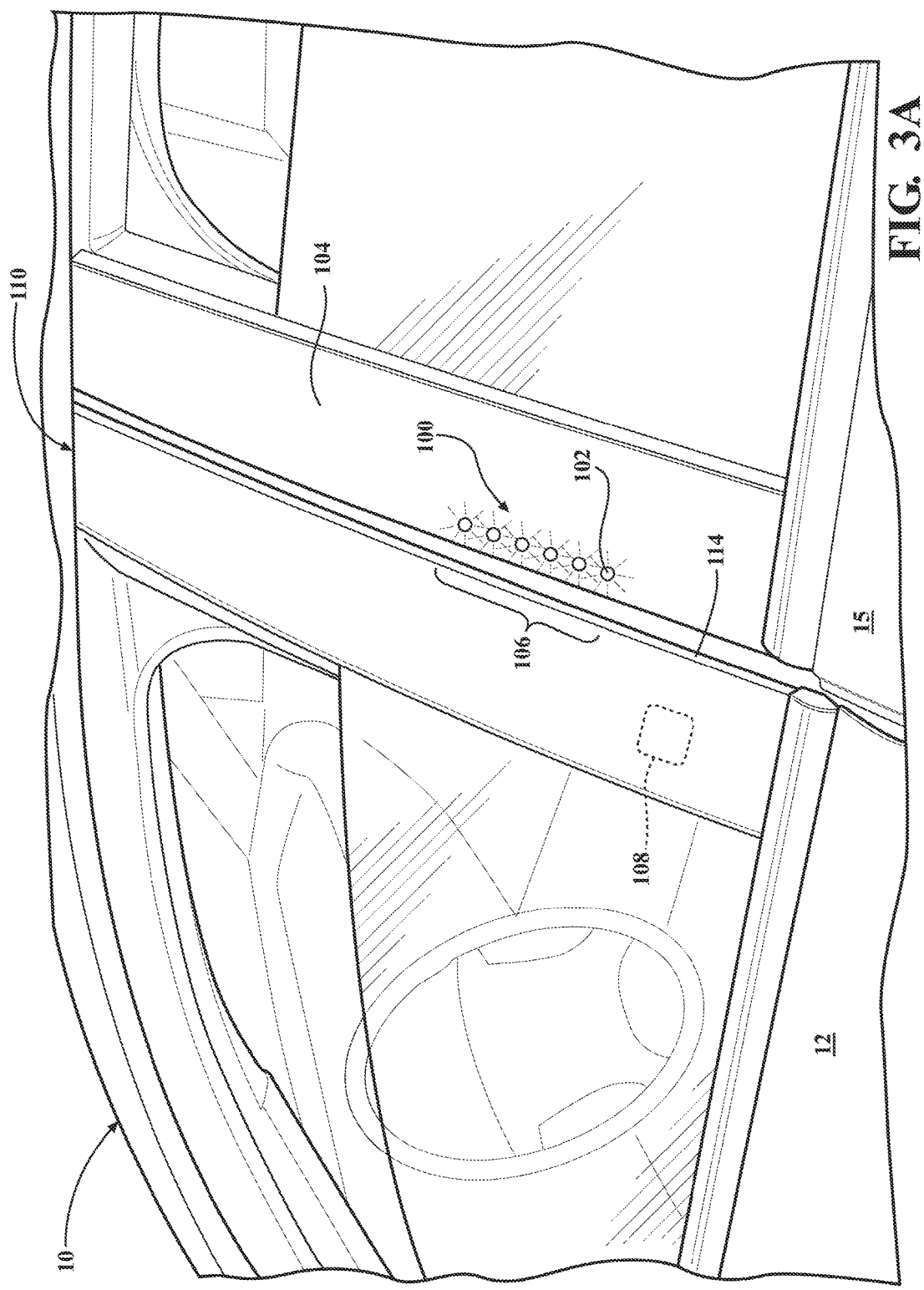

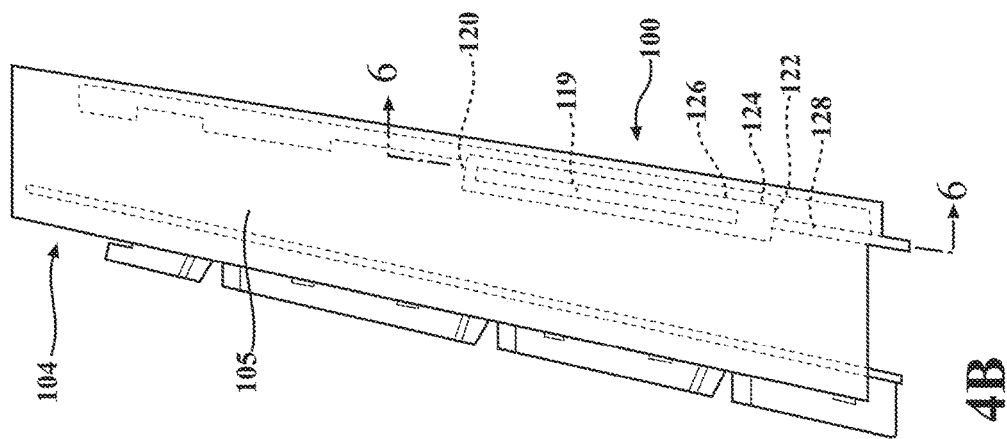
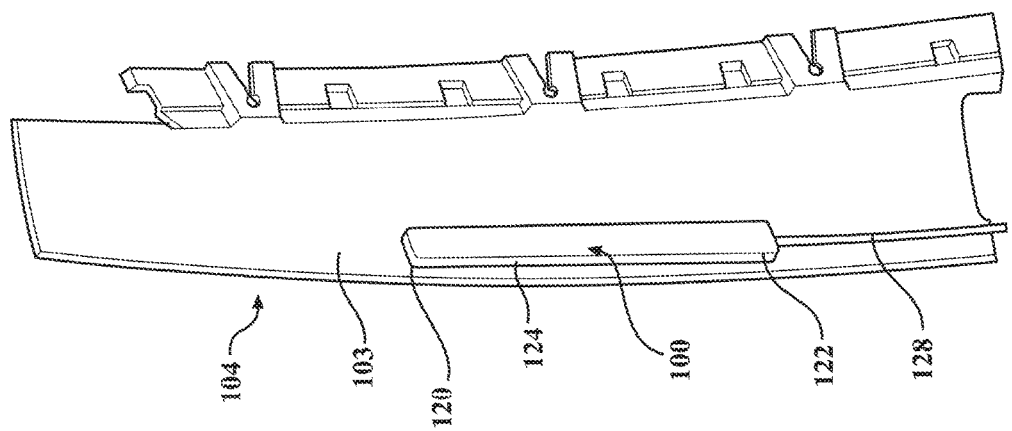

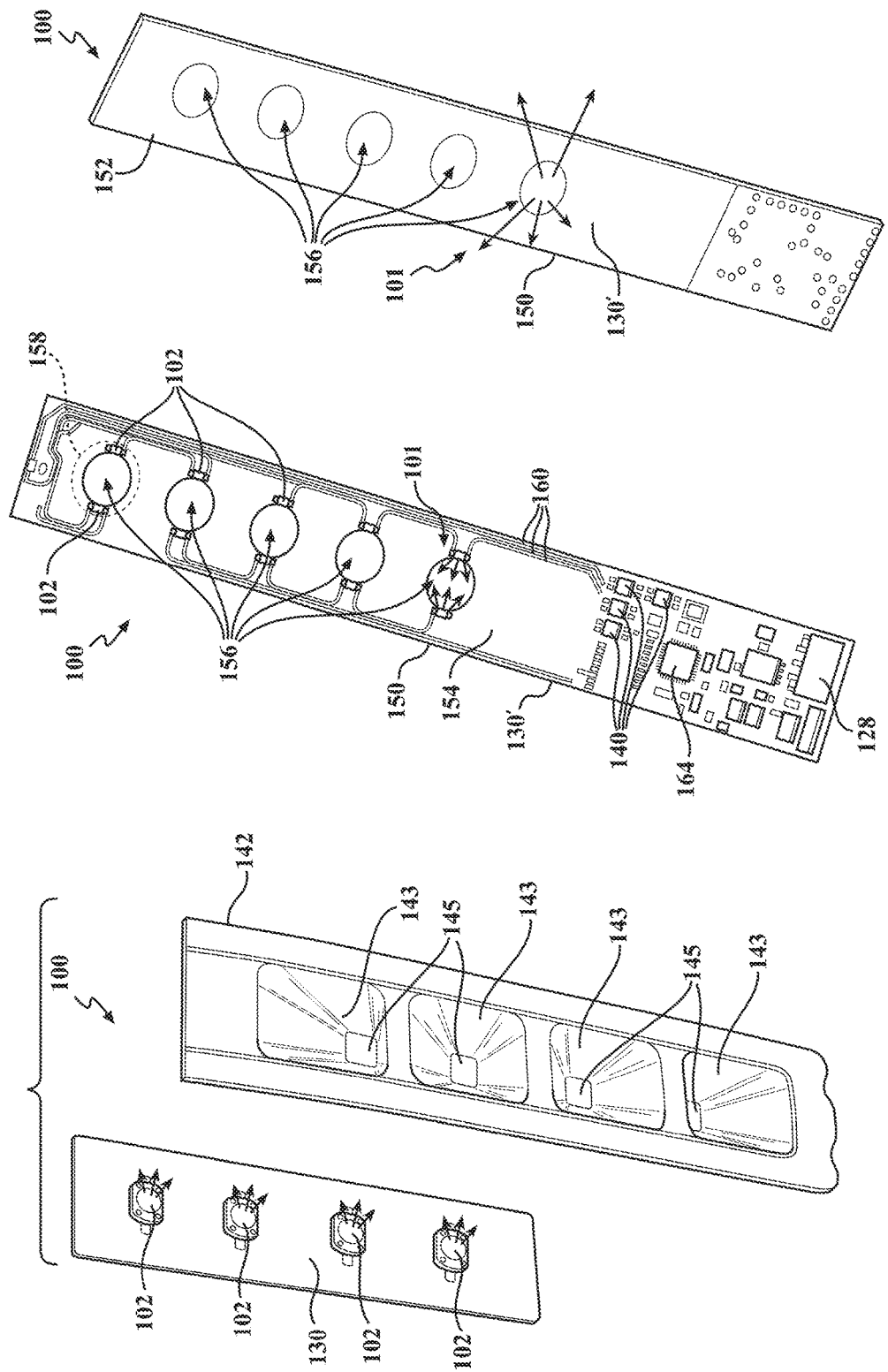

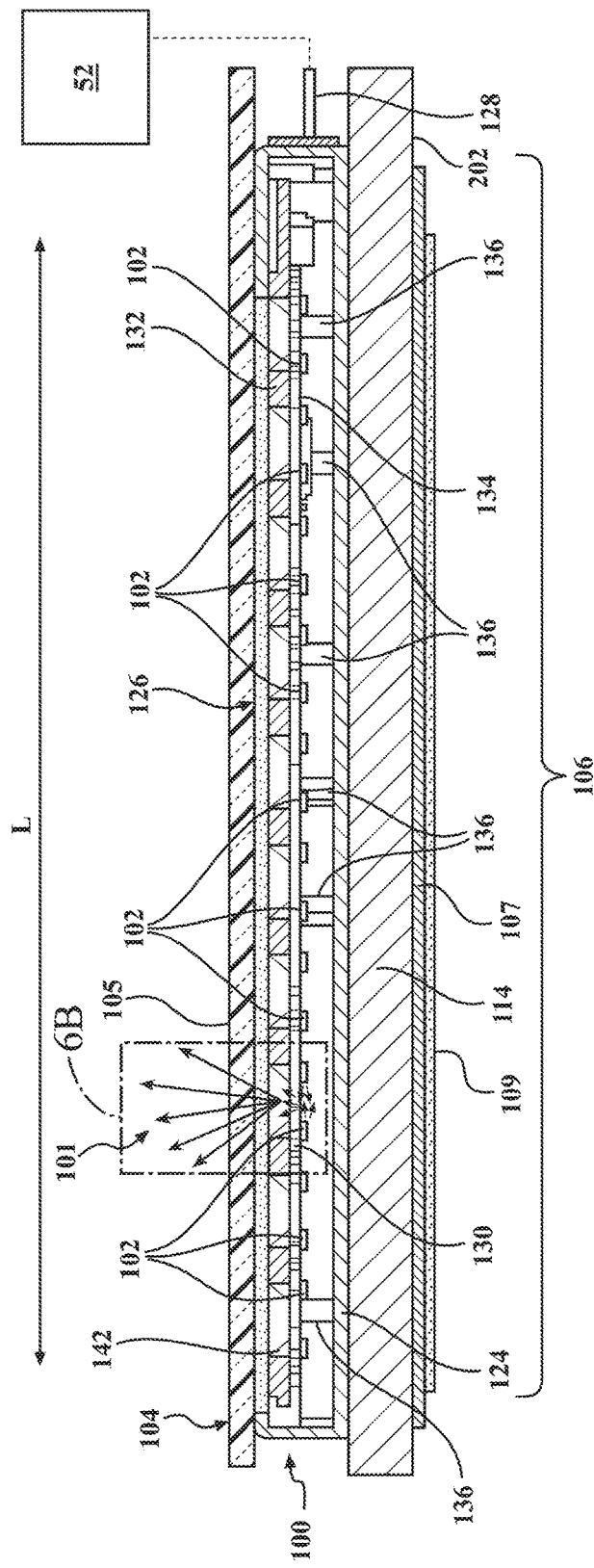
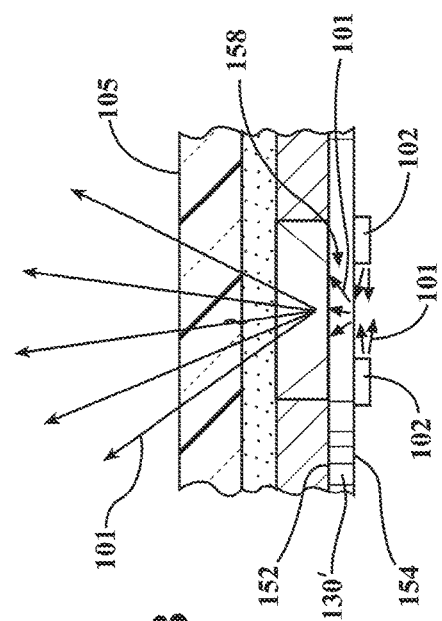
FIG. 6A
FIG. 6B

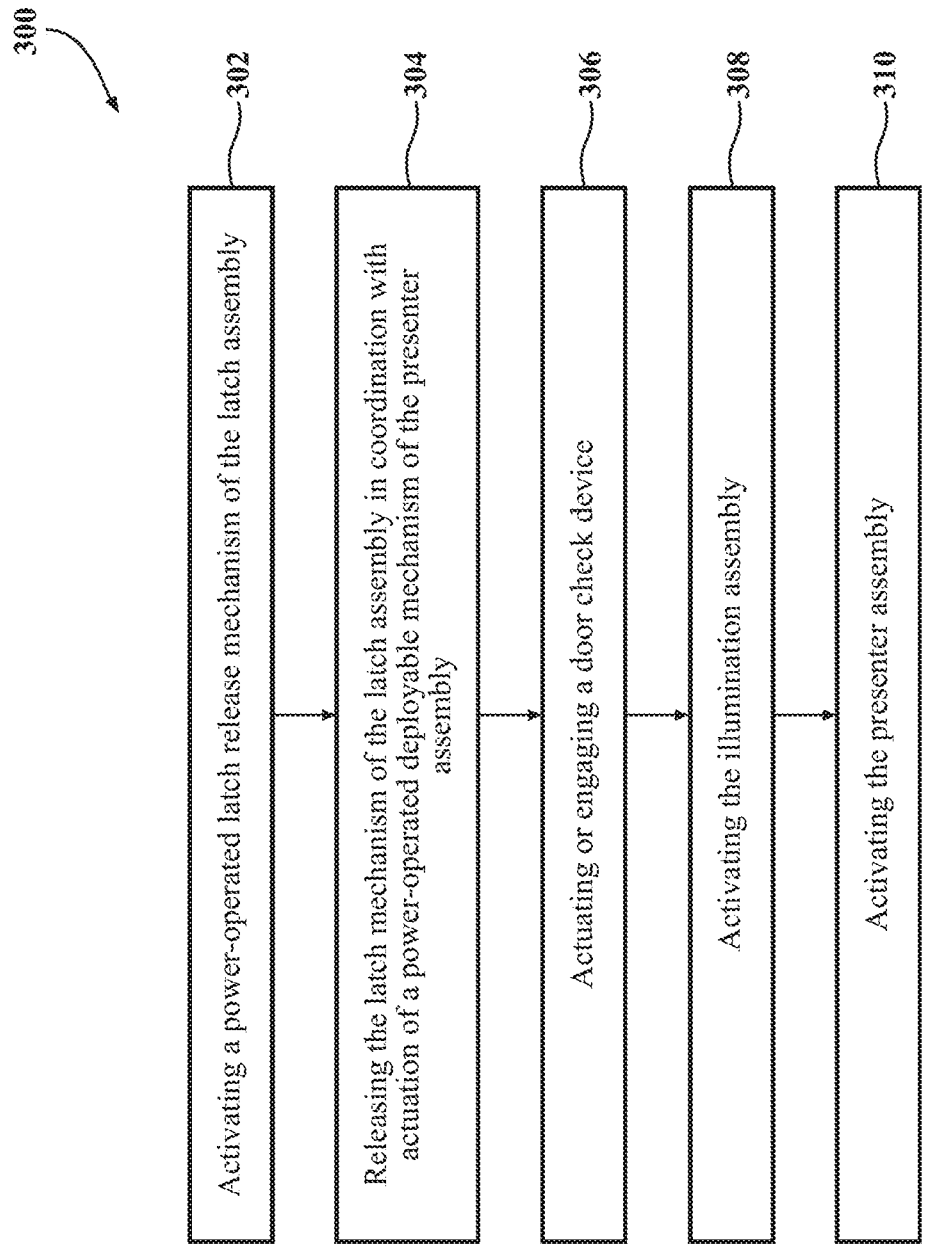

ILLUMINATED VIRTUAL HANDLE FOR POWER DOOR SYSTEM IN MOTOR VEHICLES

CROSS-REFERENCE TO RELATED APPLICATION

This application claims the benefit of U.S. Provisional Application Ser. No. 62/534,801, filed Jul. 20, 2017, which is incorporated herein by reference in its entirety.

FIELD

The present disclosure relates generally to power door systems for motor vehicles. More particularly, the present disclosure relates to a power door opening system operable to release and open a vehicle door equipped without an external door handle.

BACKGROUND

This section provides background information related to power-operated door systems for motor vehicles which is not necessarily prior art to the inventive concepts associated with the present disclosure.

In view of increased consumer demand for motor vehicles equipped with advanced comfort and convenience features, many modern motor vehicles are now equipped with passive entry systems to permit locking and release of vehicle doors without the use of traditional key-type manual entry systems. In this regard, some of the more popular features now available include power locking and unlocking, power release, power cinching, and power opening. Most of these "powered" features are typically integrated into a latch assembly mounted to the vehicle door and which is equipped with a latch mechanism and one or more electrical actuators controlling operation of related mechanisms including, for example, a latch release mechanism, a child-lock mechanism and a cinch mechanism. The power door opening feature is commonly provided by a stand-alone power-operated door presenter assembly operable, in coordination with the latch assembly, to move the door from a closed position to a partially-open position so as to subsequently permit the user to manually move the door completely to its fully-open position. Alternatively, the power-operated door presenter assembly can be integrated into the latch assembly.

Typically, the power release feature and subsequent power opening feature have resulted from actuation of a switch or sensor mounted to, or associated with, the outside door handle on the vehicle door following user authentication (i.e. via a key fob). In many arrangements, the user is required to pull on the outside door handle to actuate the power release function. In addition, some outside handle systems include an illumination arrangement to provide added convenience, such as is disclosed in U.S. Publication No. US 2013/0130674. However, attention has recently been directed toward development of "handleless" doors, namely passenger doors without an outside door handle, to provide a more aesthetic and aerodynamic vehicle profile. In such arrangements, a door-mounted release switch, commonly mounted on the applique associated with the vertical pillar section of the door, is actuated by the user to initiate the power release (and power opening if available) function following the user authentication process. This user activation can be with or without physical contact (i.e. microswitch, capacitive switch, IR, IR TOF, LIDAR, radar and/or voice activation, etc.) with respect to the door-mounted release switch.

While current power-operated handleless door systems are sufficient to meet all regulatory requirements and provide levels of comfort and convenience, a need exists to continue development of advanced technology and provide alternative arrangements and features that provide enhanced comfort and convenience to the user.

SUMMARY

This section provides a general summary of the inventive concepts associated with the present disclosure. Accordingly, this section is not intended to be interpreted as a comprehensive and exhaustive listing of all features, aspects, objectives and/or advantages associated with the inventive concepts which are further described and illustrated in the following detailed description and the appended drawings.

It is an objective of the present disclosure to provide a motor vehicle closure member system including a closure member configured without an external handle (hereinafter "the handleless closure member") and which is equipped with a latch assembly providing a power release function and an illumination assembly providing an illuminated opening function.

It is a related objective of the present disclosure to further provide the handleless closure member with a presenter assembly providing a power opening function and a power closing function.

It is a further objective of the present disclosure to configure the handleless closure member as a swing-type passenger-entry door capable of being released via a passive keyless entry system for subsequent movement from a closed-unlatched position to a partially-open position in response to actuation of the presenter assembly while the illumination assembly provides illumination along certain portions of the handleless door to assist the user in identifying and grabbing a grasp area of the door for subsequent manual movement from the partially-open position into a fully-open position.

In accordance with these and other objectives, the motor vehicle closure member system of the present disclosure is operable to: A) permit passive activation of the power release function with or without physical contact with the handleless door; B) release the latch assembly to place the door in an unlatched state; C) activate the presenter assembly into a deployed state to provide the power opening function for moving the handleless door from its unlatched/closed position to a partially-open position; D) engage or actuate a door check function configured to hold the handleless door in its partially-open position; E) activate the illumination assembly to turn on an illumination source (i.e. LEDs or electroluminescence device, etc.) so as to provide a visual indication to the user that the door is ready to be manually opened to its fully-open position and to highlight the grasp area portion of the door edge to be used as a grabbing feature; and F) maintain the presenter assembly in its deployed state until the door is moved to its fully-opened position and then, or after a certain time, return the presenter assembly to its non-deployed state upon turning off the illumination source, wherein turning off the illumination source acts as an indicator to the user that the door is about to be returned to its closed position.

In accordance with an aspect, a closure panel system for a motor vehicle includes a handleless closure panel pivotably mounted to a vehicle body for movement between a closed position and a fully-open position, with the handleless closure panel having a grasp area. A latch assembly is mounted to the handleless closure panel and equipped with a latch mechanism and a power-operated latch release mechanism to provide a power release function. A presenter assembly is operably disposed between the vehicle body and the handleless closure panel and equipped with a power-operated presenter mechanism to provide a power open function for moving the handleless closure panel from its closed position to a partially-open position. An illumination assembly is mounted on the handleless closure panel in proximity to the grasp area and operable to provide illumination. The system further includes an electronic control system operable to actuate the power-operated latch release mechanism to release the latch mechanism and shift the latch assembly into an unlatched mode for releasing the handleless closure panel from latched engagement with the vehicle body; to actuate the power-operated presenter mechanism to shift the presenter assembly from a non-deployed mode to a deployed mode to move the handleless closure panel from its closed position to its partially-open position; and to activate the illumination assembly to an illuminated state to illuminate the grasp area of the handleless closure panel and provide a visual indication to a user that the handleless closure panel is in the partially-open position and ready to be moved to the fully-open position.

In accordance with another aspect, the electronic control system can be configured to deactivate the illumination assembly to a non-illuminated state upon the door remaining in the partially-open position for a predetermined period of time.

In accordance with another aspect, the electronic control system can be configured to actuate the power-operated presenter mechanism to shift the presenter assembly from the deployed mode to the non-deployed mode to move the handleless closure panel from its partially-open position to its closed position after deactivating the illumination assembly to the non-illuminated state.

In accordance with another aspect, the illumination assembly can be incorporated into a portion of the door adjacent an edge of the door.

In accordance with another aspect, the illumination assembly can be incorporated into a window pillar portion of the door.

In accordance with another aspect, the illumination assembly can be incorporated into an applique mounted to the window pillar portion of the door.

In accordance with another aspect, the applique can be translucent and the illumination assembly can be located beneath the applique to backlight the applique in the region of the grasp area.

In accordance with another aspect, the illumination assembly can be incorporated into a portion of the door below a window pillar portion of the door.

In accordance with another aspect, the illumination source can include at least one light-emitting diode (LED).

In accordance with another aspect, the illumination source can include a plurality of light-emitting diodes (LEDs).

In accordance with another aspect, an illumination assembly for a handleless closure panel pivotably mounted to a motor vehicle body for movement between a closed position and a partially-open position via actuation of a power-operated presenter mechanism in response to a signal from an electronic control system to the power-operated presenter mechanism is provided. The illumination assembly includes an illumination source configured to be mounted on the handleless closure panel in proximity to a grasp area of the handleless closure panel. The illumination source is configured to be connected in operable communication with the electronic control system for selective activation to an illuminated state to illuminate the grasp area of the handleless closure panel when the handleless closure panel is in the partially-open position.

In accordance with another aspect, the illumination assembly can include an applique configured to be mounted to the window pillar portion of the door, wherein the illumination source is mounted to the applique.

In accordance with another aspect, the applique of the illumination assembly can include a translucent region and the illumination source can be located beneath the translucent region to backlight the applique.

In accordance with another aspect, there is provided an illumination assembly for a vehicle applique, including a printed circuit board having a front side and a back side, the printed circuit board including a top layer being optionally electrically conductive and defining the front side of the printed circuit board, the top layer of the printed circuit board including at least one aperture etched into the top layer, the printed circuit board further including a base layer under the top layer, the base layer being at least partially formed of an optically transparent material and defining the back side of the printed circuit board, at least one light emitting device disposed under the at least one aperture for selectively illuminating the optically transparent material of the base layer under the at least one indicia to illuminate the at least one indicia, a controller unit coupled to the at least one light emitting device and configured to selective illumination of the at least one light emitting device.

Further areas of applicability will become apparent from the description provided herein. The description and specific embodiments listed in this summary are not intended to be limiting.

BRIEF DESCRIPTION OF THE DRAWINGS

Other aspects, features and advantages of the present disclosure will be readily appreciated, as the same becomes better understood by reference to the following detailed description when considered in connection with the accompanying drawings wherein:

FIG. 3A is an enlarged perspective view of a portion of the handleless closure panel shown in FIG. 1, with the handleless closure panel shown moved to a partially-open position by the presenter assembly and the illumination assembly operating in an illuminated state, the illumination assembly mounted on the window pillar portion of an adjacent door;

FIG. 4A is a rear perspective view of an applique having an illumination assembly mounted to a rear surface of the applique, in accordance with an illustrative embodiment;

FIG. 4B is a front perspective view of an applique having an illumination assembly mounted to a rear side of the applique, in accordance with an illustrative embodiment;

FIG. 5A is a front disassembled perspective view of a PCB having an array of LEDS mounted thereto and a reflector associated with the plurality LEDS, in accordance with an illustrative embodiment;

FIGS. 5B and 5C are rear and front perspective views, respectively, of a PCB having an array of LEDS mounted thereto and having an integrated diffuser, in accordance with an illustrative embodiment;

FIG. 6A is a side cross sectional view of the illumination assembly of FIGS. 5B to 5E, in accordance with an illustrative embodiment;

FIG. 6B is an enlarged view of area 6B of FIG. 6A illustrating the diffusion of light through a PCB light channel, in accordance with an illustrative embodiment;

FIG. 8 is flow chart illustrating the steps of a method of illuminating a grasping area of a handleless door, in accordance with an illustrative embodiment;

Corresponding reference numerals are used to indicate corresponding components throughout the several views of the drawings unless otherwise indicated.

DETAILED DESCRIPTION OF EXAMPLE EMBODIMENTS

Figure 1:
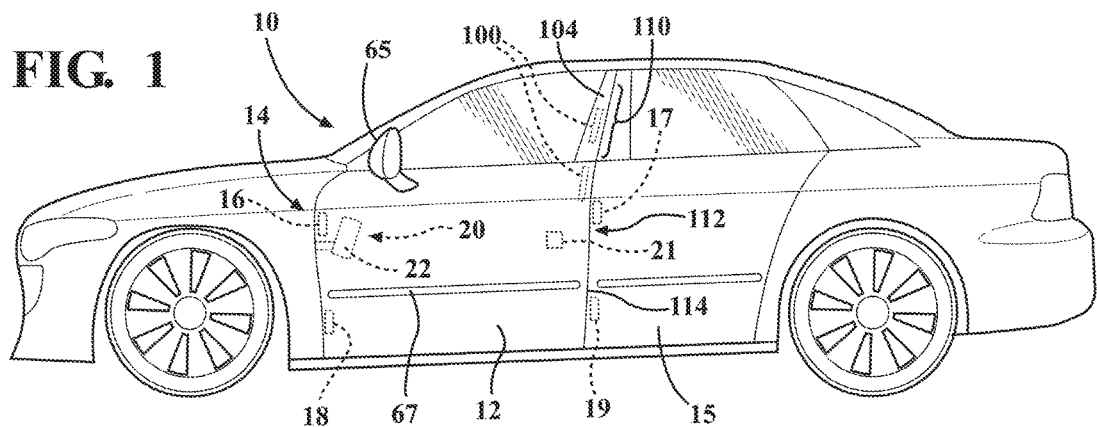
FIG. 1 is a side view of a motor vehicle equipped with a closure member system embodying the inventive concepts of the present disclosure and including a handleless closure panel equipped with a latch assembly providing a power release function, a presenter assembly providing a power opening function, and an illumination assembly providing an illuminated closure panel opening function.

Example embodiments will now be described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

In the following detailed description, the expression "latch assembly" will be used to generally, as an illustrative example, indicate any power-operated latch device adapted for use with a vehicle closure panel to provide at least a power release feature. Additionally, the expression "closure panel" will be used to indicate any element moveable between an open position and at least one closed position, respectively opening and closing an access to an inner compartment of a motor vehicle and therefore includes, without limitations, decklids, tailgates, liftgates, bonnet lids, and sunroofs in addition to the sliding or pivoting side passenger doors of a motor vehicle to which the following description will make explicit reference, purely by way of example. Furthermore, the expression "presenter assembly" will be used to generally indicate any power-operated presenter device adapted for use with a vehicle closure panel to provide a power opening feature capable of unidirectionally or bidirectionally moving the vehicle closure panel between a closed position and an open position, preferably a partially-open position, with respect to the body portion of the motor vehicle. The expression "handleless" will be used in conjunction with vehicle closure panel to indicate such a closure panel configured without an external (i.e. outside) handle. Finally, the expression "door dock check device" will be used to generally indicate any mechanical or power-operated device adapted for use with the vehicle closure panel to provide a position checking feature capable of holding the vehicle closure panel in at least one partially-open position.

Problem to be Solved

Vehicle closure systems, particularly related to vehicle closure panels of the passenger-entry type, are evolving toward fully automated closure panel opening and closure panel closing solutions requiring less interaction with the user to open and close the vehicle closure panel, referred to hereafter as door. One such system involves "presenting" the door to the user as he/she approaches the motor vehicle. This presenting function involves initially unlatching a latch assembly associated with the door and subsequently moving the door from a closed position to a partially-opened position so the user can subsequently manually move the door to a fully-open position, typically by grabbing an outside door handle. Still in other systems, a power release mechanism associated with the latch assembly can be actuated to unlatch the latch assembly upon an unlock command being received by a latch controller in response to activation of the outside door handle. For closure systems associated with closure panels configured without an outside handle (i.e. a handleless door), for example those equipped with a touch or touchless type of keypad, or fob-based authentication system, which replace the "manual pull" handle unlatch function with an electronic touch or swipe function or keyless FOB, the handleless door may be unlatched but the user cannot grasp a door handle, being there is no door handle, to further move the door to its fully-open position. Instead, the user must reach their fingers between an edge of the door and the vehicle body and pull manually on the door edge itself. When users first encounter handleless door systems, they may not be aware that they must physically grasp an area of the door edge to further open the door, thereby presenting the users with a problem of not knowing how or where best to grasp the door to further open the door. Certain areas along the door edge can be outfitted with, or configured to include, a grasping area (virtual handle) having a rubber grip pad to designate the preferred grasp area of the handleless door; however, the user may not recognize these areas without first having familiarity and clear sight of their presence.

Solution to the Problem

The inventive aspects of the present disclosure, to be hereinafter described in greater detail, are directed to providing the user with a visual indication of the appropriate grasp area (virtual handle) along an edge of a closure panel, e.g. door edge of the handleless door. This visual indication is provided by an "illumination assembly" aligned with and/or in close proximity to the grasp area and which functions to alert the user of the correct position of the handleless door grasp area and the appropriate time when the door has been deployed to its partially-open position by the presenter assembly. This solution may, in accordance with a non-limiting embodiment, provide a method of unlocking the handleless door using the power release function of the latch assembly and deploying the door from its closed/unlatched position to its partially-open position using the power opening function of the presenter assembly. This method may include the steps of: A) activating a power-operated latch release mechanism of the latch assembly by providing the latch controller with a release command signal using a contact or non-contact unlocking/power release interface (i.e. microswitch, capacitive switch, infrared (IR), IR Time of Flight (TOF), LIDAR, radar, voice activation, FOB, wireless, etc.); B) releasing the latch mechanism of the latch assembly in coordination with actuation of a power-operated deployable mechanism of the presenter assembly to move (i.e. present) the door from its unlatched/closed position to a partially-open position; C) actuate (i.e. power-operated) or engaged (mechanically-operated) a door check device to provide a door check function for maintaining or holding the door in its presented partially-open position (i.e. to avoid wind or slope based external forces from returning the door to unlatched/closed position or unintentionally moving the door to its fully-opened position); D) with the door held in its properly presented partially-open position, the illumination assembly is activated into an illuminated state to provide an illuminated visual indication that the door is ready to be manually moved to its fully-open position by the user and to identify the grasp area of the door; and E) if the door is not manually moved to its fully-open position within a certain predetermined time period, the presenter assembly is activated to return to its non-deployed state for moving the door back to its closed position. Note that the illumination assembly can be returned to its non-illuminated state prior to initiation of the power closing operation to notify the user that the door is no longer in a state to be grasped and manually opened.

Example Embodiment

To better describe and illustrate the inventive aspects of the present disclosure directed to providing at least the above-noted solutions, initial reference is directed to FIG. 1 which generally shows an example motor vehicle 10. Motor vehicle 10 includes a front closure panel, also commonly referred to as closure member, such as a passenger door, and shown as a front passenger door 12, by way of example and without limitation, pivotably mounted to a vehicle body 14 via upper and lower hinges 16 and 18 for swinging movement between a closed position (shown) and a fully-open position. Motor vehicle 10 is also shown including a rear closure panel or door 15 pivotably mounted to a central pillar segment of vehicle body 14 via upper and lower hinges 17 and 19 for swinging movement between a closed position (shown) and a fully-open position. Front door 12 and rear door 15 are shown to be configured without outside door handles so as to each define a "handleless" closure member that is part of a closure panel system, also referred to as power door actuation system 20.

Power door actuation system 20 is shown schematically to include a latch assembly 21 and a presenter assembly 22. Latch assembly 21 is mounted to front door 12 and includes (in this non-limiting configuration) a latch mechanism configured to engage a striker (not shown) provided on the vehicle body 14, a power-operated latch release mechanism, and a power-operated lock mechanism. Latch assembly 21 is defined to be operating in a locked-latched mode when the latch mechanism is latched and the lock mechanism is locked for holding front door 12 in a locked-closed position. Latch assembly 21 is also defined to be operating in an unlocked-latched mode when the latch mechanism is latched and the lock mechanism is unlocked for holding front door 12 in an unlocked-closed position. Finally, latch assembly 21 is defined to be operating in an unlatched mode when the latch mechanism is released and the lock mechanism is unlocked so as to permit movement of front door 12 from its unlocked-closed position toward a fully-open position. At least one electrically-powered latch actuator is provided in association with latch assembly 21 for controlling operation of the latch release and lock mechanism to provide a power release function and a power lock function. An activation command signal generated by an authentication device is used by a latch controller to initiate operation of the electric latch actuator to provide the desired power release and power lock functions. The authentication device is associated with a passive keyless entry system and may include, without limitation, a key fob, a contact or non-contact interface provided on front door 12, and a voice recognition interface. The specific details of latch assembly 21 and its activation protocol are not required as those skilled in the art understand the provisions of the power release and power lock functionality discussed above.

Figure 2:
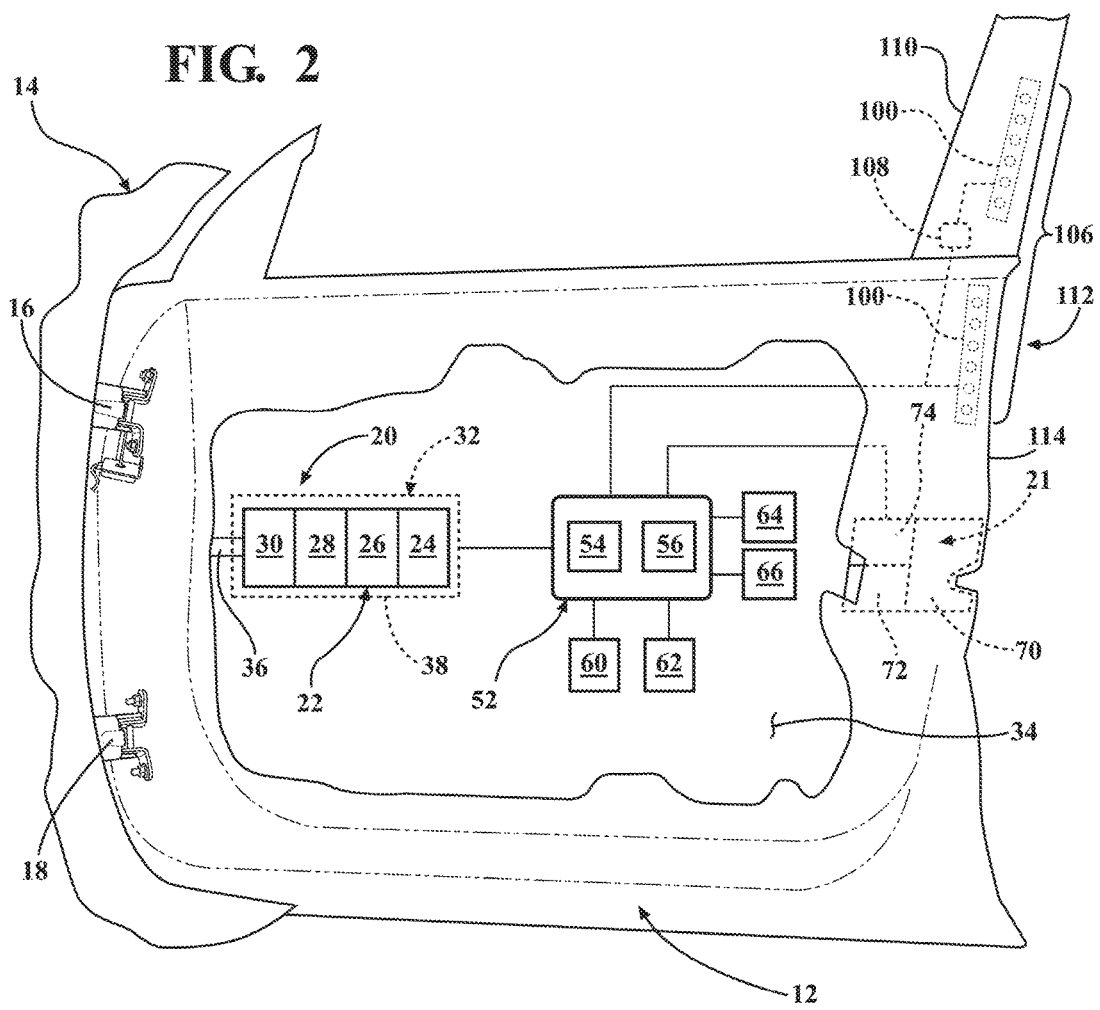
FIG. 2 is a diagrammatic view of a portion of the handleless closure panel shown in FIG. 1, with various components removed for clarity purposes only, in relation to a portion of the vehicle body and which is equipped with a latch assembly and a presenter assembly.

Power door actuation system 20 is diagrammatically shown in FIG. 2 to include a power-operated swing door presenter mechanism, also referred to as power swing door actuator 32, comprised of an electric motor 24, a reduction geartrain 26, a slip clutch 28, and a drive mechanism 30 which together define powered door presenter assembly 22 that is mounted within an interior chamber 34 of door 12. Examples of presenter assemblies are shown in commonly-owned U.S. application Ser. No. 15/473,713, titled "Power Swing Door Actuator With Articulating Linkage Mechanism", published as U.S. Publication No. US 2017/0292310 A1, the entire application being incorporated by reference herein. Presenter assembly 22 also includes a connector mechanism 36 configured to connect an extensible member of drive mechanism 30 to a portion of vehicle body 14. Other types of presenter mechanisms may be provided, such as those whereby the connector mechanism 36 remains disconnected with from a portion of vehicle body 14 and is configured to urge or "push" the door 12 to a "presented position" (e.g. to create a 20 mm and 70 mm gap between the door edge 114 and the vehicle body 14). Presenter assembly 22 further includes a support structure, such as an actuator housing 38, configured to be secured to door 12 within chamber 34 and to enclose electric motor 24, reduction geartrain 26, slip clutch 28 and drive mechanism 30 therein. As also shown, an electronic control module 52 is in communication with electric motor 24 for providing electric control signals thereto. Electronic control system, also referred to electronic control module 52, may include a microprocessor 54 and a memory 56 having executable computer readable instructions stored thereon for execution by the microprocessor 54. Electronic control module 52 may include hardware and/or software components. Electronic control module 52 can be integrated into, or directly connected to, actuator housing 38 or may be a remotely located device within door chamber 34 or may be integrated into latch assembly 21.

Although not expressly illustrated, electric motor 24 can include Hall-effect sensors for monitoring a position and speed of vehicle door 12 during movement between its open and closed positions. For example, one or more Hall-effect sensors may be provided and positioned to send signals to electronic control module 52 that are indicative of rotational movement of electric motor 24 (e.g. a motor shaft) and indicative of the rotational speed of electric motor 24, e.g., based on counting signals from the Hall-effect sensor detecting a target on a motor output shaft. In situations where the sensed motor speed is greater than a threshold speed and where the current being supplied to the motor 24 (e.g. as detected by a current sensor or sensing circuitry) registers a significant change in the current draw, electronic control module 52 may determine that the user is manually moving door 12 while motor 24 is also operating, thus moving vehicle door 12. Electronic control module 52 may then send a signal to electric motor 24 to stop motor 24 and may even disengage slip clutch 28 (if provided) to facilitate manual override movement. Conversely, when electronic control module 52 is in a power open or power close mode and the Hall-effect sensors indicate that a speed of electric motor 24 is less than a threshold speed (e.g., zero) and a current spike is registered either directly or indirectly by microprocessor 54 and/or any current sensing circuity, electronic control module 52 may determine that an obstacle is in the way of vehicle door 12, in which case the electronic control system may take any suitable action, such as sending a signal to turn off electric motor 24. As such, electronic control module 52 receives feedback from the Hall-effect sensors to ensure that a contact obstacle has not occurred during movement of vehicle door 12 from the closed position to the partially-open position, or vice versa. Other position sensing techniques to determine that the door 12 is being moved, either by the electrical motor 24 and/or a manual user control are also possible.

As is also schematically shown in FIG. 2, electronic control module 52 can be in communication with a remote key fob 60 and/or with an external door-mounted switch 62 (contact such as a piezoelectric switch, or contactless such as a capacitive sensor) for receiving a request from a user to open or close vehicle door 12. Put another way, electronic control module 52 receives a command signal from either remote key fob via a key fob sensor 60 and/or door switch 62 to initiate an opening or closing of vehicle door 12. Upon receiving a command, electronic control module 52 proceeds to provide a signal to electric motor 24 in the form of a pulse width modulated voltage (for speed control) as an example to turn on motor 24 and initiate pivotal swinging movement of vehicle door 12. While providing the signal, electronic control module 52 also obtains feedback from the Hall-effect sensors of electric motor 24 to ensure that a contact obstacle has not occurred. If no obstacle is present, motor 24 will continue to generate a rotational force to actuate spindle drive mechanism 30. Once vehicle door 12 is positioned at the desired location, motor 24 is turned off and the "self-locking" gearing associated with gearbox 26 causes vehicle door 12 to continue to be held at that location, thereby providing an automatic door checking function. If a user tries to move vehicle door 12 to a different operating position, electric motor 24 will first resist the user's motion (thereby replicating a door check function) and eventually release and allow door 12 to move to the newly desired location. Again, once vehicle door 12 is stopped, electronic control module 52 will provide the required power to electric motor 24 to hold it in that position. If the user provides a sufficiently large motion input to vehicle door 12 (i.e., as is the case when the user wants to close the door), electronic control module 52 will recognize this motion via the Hall effect pulses and proceed to execute a full closing operation for vehicle door 12.

Electronic control module 52 can also receive an additional input from proximity sensor, such as an ultrasonic sensor 64 positioned on a portion of vehicle door 12, such as on a door mirror 65 or the like. Ultrasonic sensor 64 detects if an obstacle, such as another car, tree, or post, is near or in close proximity to vehicle door 12. If such an obstacle is present, ultrasonic sensor 64 will send a signal to electronic control module 52 and electronic control module 52 will proceed to turn off electric motor 24 to stop movement of vehicle door 12, thereby preventing vehicle door 12 from hitting the obstacle. This provides a non-contact obstacle avoidance system. In addition, or optionally, a contact obstacle avoidance system, such as a pinch detection system, can be placed in vehicle 10 which includes a contact sensor 66 mounted to door, such as in association with molding component 67, and which is operable to send a signal to controller 52 that an obstacle is detected, such as a user's finger detected in a gap between the vehicle body 14 and the door 12.

Power door actuation system 20 is also shown schematically in FIG. 2 with latch assembly 21 having a latch mechanism 70, a latch release mechanism 72, and a power-operated release actuator such as an electric power release motor 74. For purposes of illustration only control module 52 is shown in communication with electric power release motor 74 so as to also act as a latch controller for controlling operation of latch assembly 21. Control module 52 can be an integrated configuration or a pair of distinct controllers associated with presenter assembly 22 and latch assembly 21. Key fob sensor 60 and/or door switch 62 are again used to authenticate the user and control the power release (and power lock) function.

Figure 3:
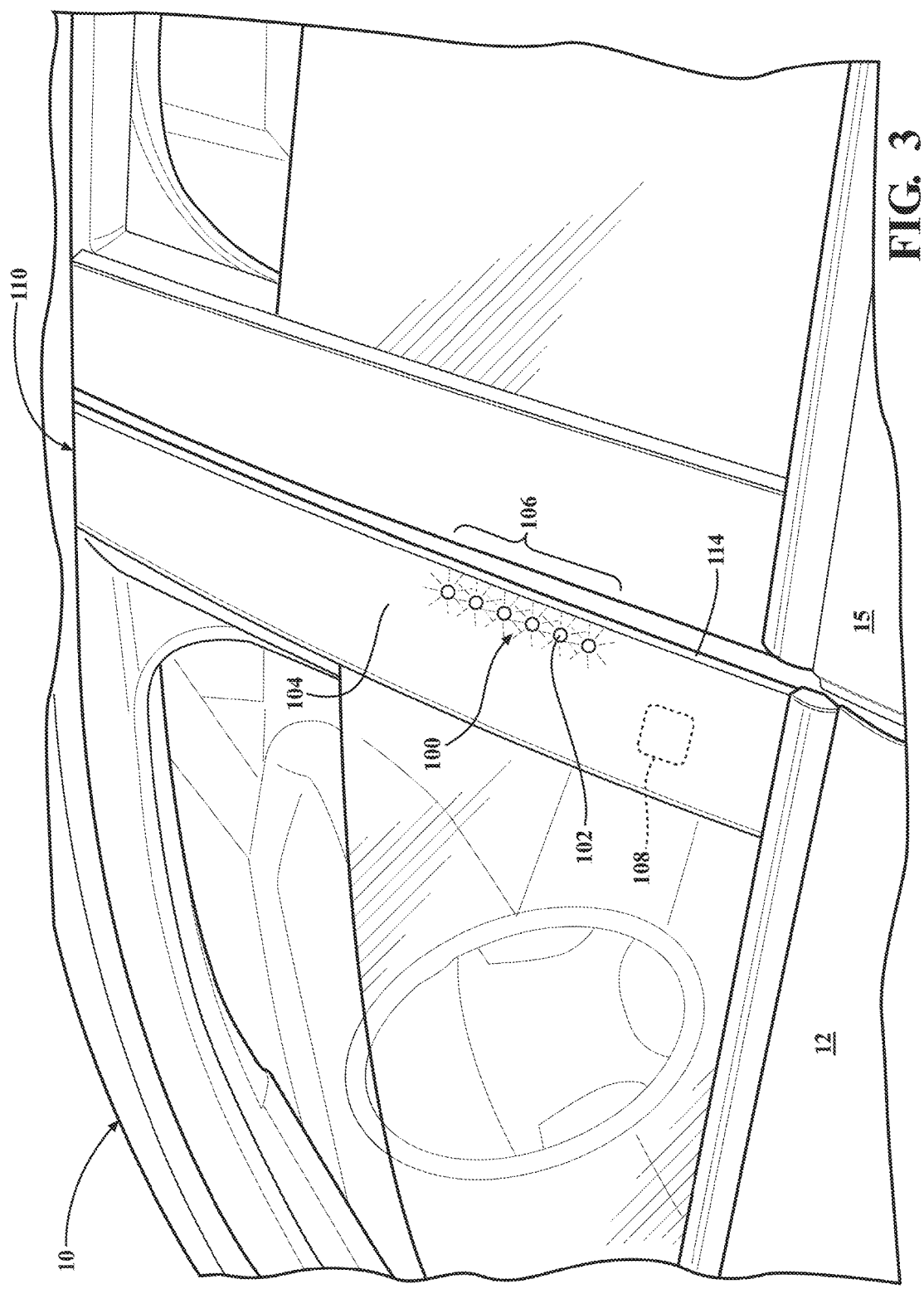
FIG. 3 is an enlarged perspective view of a portion of the handleless closure panel shown in FIG. 1, with the handleless closure panel shown moved to a partially-open position by the presenter assembly and the illumination assembly operating in an illuminated state, the illumination assembly mounted on the window pillar portion of the door.

Referring now to FIG. 3, an enlarged view of an example embodiment of an illumination assembly 100, in accordance with one aspect of the disclosure, of closure panel system 20 of vehicle 10 is shown. In general, illumination assembly 100 is configured to provide the user with a visual indication that door 12 has been moved by presenter assembly 22 into its partially-open position presented position (e.g. a position ranging between 20 mm to 70 mm of the door 12 from the vehicle body 14, sufficient for the fingers of a user to be inserted into a gap formed between the body 14 and the door 12) and is now ready to be manually moved to its fully-open position. Illumination assembly 100 may include at least one illumination source 102, shown by way of example as a plurality of vertically-aligned LEDs 102, oriented to illuminate on, in and/or through (i.e. backlight through translucent material of a translucent region) an applique 104 fixed to door 12. The at least one illumination source 102 may comprise any suitable illumination source or light source. For example, the illumination source 102 may include one or more light emitting diodes (LEDs), such as white light-emitting LEDs or high intensity power LEDs or organic light emitting diodes (OLEDs) or the like. The at least one illumination source 102 may comprise a substantially white light emitting illumination source, or may comprise a colored light emitting illumination source (or a white light emitting illumination source may emit light that passes through a color filter or the like, which may be incorporated into a cover 126 of the illumination assembly 100 as an example and further described herein below) to provide color illumination (such as blue or amber or other color as desired) which may depend on a mode of operation, such as a day time mode of operation (max lumen output), a night time mode of operation (reduced lumen output), or a closure panel system 20 operation such as when the closure panel system 20 is in motion (green color), or has stopped (red color). When powered, the LEDs 102 may provide up to about 11,000 nits minimum average brightness at nominal supply voltage (such as between about 9 and 16 volts DC, such as about 13.5 Volts DC), with a generally uniform illumination. The LEDs 102 may emit colored light or white light, depending on the particular application and time of day operating conditions, and may operate at a maximum current of about 100 mA and may be operable at temperatures between about −30 degrees C. and +65 degrees C. For example, during a day light time operating condition, to ensure the LEDS 102 are visible, the LEDs 102 may be driven at a maximum lumen output, whereas during a night time operating condition, to ensure the LEDS 102 are not over powering to the user, the LEDs 102 may be driven at a reduced lumen output. The control circuit or control system 200 as will be described hereinbelow is operable to control the LEDs 102 such as to control powering/unpowering/dimming of the illumination sources in the scenarios as described hereinabove above.

In another embodiment, the applique 104 may be fixed to a B-pillar adjacent to door 12, or along the front window pillar of adjacent rear door 15 as illustrated in FIG. 3A. Upon illumination of LEDs 102, the user is visually informed to grasp along a grasp area 106 (virtual handle) of a door edge 114 of door 12. The length of the LED 102 array may correspond to the grasping area 106 provided on the opposite side of the door edge 114 so as to inform a user of the limits of the grasping area. It is to be recognized that applique 104 may be constructed entirely of translucent material or a select region of applique 104 configured to align with grasp area 106 can be formed of translucent material so as to allow light from the LEDs 102 positioned behind the applique 104 to pass therethrough. Grasp area 106 can be provided with a gripping surface, such as a contoured rubber grip pad or like, as desired, and can further be reinforced within door 12, as desired. Grasping area 106 can be provided with a textured grasping surface 109 such as a rubber coating or provided with formed undulating projections to mate with the fingers of a user, provided on the inner side of the door edge 114, conveniently inconspicuous from the exterior of the vehicle 10 when the door 12 is closed, for providing grip to the user's fingers when opening door 12. Grasping area 106 can also be provided with a pressure detection sensor 109, for example as is shown in commonly-owned U.S. application Ser. No. 15/236,591, filed Aug. 15, 2016, titled "Variable Resistance Conductive Rubber Sensor and Method of Detecting an Object/human Touch Therewith", published as U.S. Publication No. US 2017/0052270 A1, the entire application being incorporated by reference herein, in electrical communication with the controller 52 provided on the inner side of the door edge 114 for detecting when a user has control of the door 12 for disengagement of the clutch 28 as an example or door check. Accordingly, grasp area 106 being illuminated facilitates the user being directed to grasp a preferred, optionally reinforced and/or enhanced gripping region of door 12. A door release switch 108 is shown in this non-limiting embodiment for signaling latch assembly 21 to shift into its released mode via operable communication with electronic control module 52 and for signaling presenter assembly 22 to shift into its deployed mode, whereupon the LEDs 102 are illuminated. Then, within a predetermined, preprogrammed amount of time lapsing after the door 12 has been moved to its partially-open position, in the event the user has not manually opened the door 12 from its partially-open position, the LEDs 102 can be signaled via electronic control module 52 to be turned off before initiation of a subsequent automated power closing function, thereby providing a further visual indication to the user via the LEDs 102 no longer being illuminated that the door 12 is about to be closed via a closing signal from the electronic control assembly 52 to the presenter assembly 22 and any fingers should be withdrawn to avoid a pinch event. It is to be recognized that other than the LEDs 102 being turned off, the LEDs 102 could be transitioned to a flashing mode or otherwise altered, such as by changing color, or sequenced for example, to function as a visual indication to the user that the door 12 is about to be closed by the presenter assembly 22.

Illumination assembly 100 is configured to include at least one illumination source or light source, such as LEDs (i.e. white light-emitting, high intensity power, organic light-emitting, etc.) or an electroluminescent device, that function to emit visibly identifiable illumination when door 12 has been properly moved and held in its partially-open position via a command signal from electronic control module 52 to power swing door actuator 32. This emitted illumination, commanded via electrical communication with electronic control module 52 with illumination assembly 100 upon door 12 being moved to the partially-open position, further serves to provide a direct visual indication of the location of grasp area 106 along the door edge 114 as a result of the location of the LEDs 102 being located in proximity to and preferably immediately adjacent the grasp area 106 of door edge 114. Following a predetermined time, if the user has not manually moved door 12 out of its partially-open position, illumination assembly 100 will be deactivated via a signal from electronic control module 52 to extinguish (turn off) or otherwise alter the emitted illumination, as discussed above, thereby providing the user with a visual indication that presenter assembly 22 is about to return door 12 to its closed position via a signal from electronic control module 52 to power swing door actuator 32. Accordingly, the user can be alerted to avoid grasping the door 12 as it is being closed. A signal from the pressure sensor 107, in electrical connection with the electronic control module 52, to electronic control module 52 indicating a user is still in manual control of the door 12 can prevent the electronic control module 52 from actuating the presenter assembly 22 to return door 12 to its closed position.

Applique 104 can be pre-assembled as a sub-assembly to include illumination assembly 100 and door release switch/sensor 108 incorporated therein, such that the applique 104 sub-assembly can be subsequently installed along a window pillar section 110 of door 12, as shown in FIG. 3. Alternatively, or in addition, as shown in FIGS. 1 and 2, illumination assembly 100 can be located along a lower portion 112 adjacent a door edge 114 of door 12 in the event that grasp area 106 is positioned below the window pillar. For example, a cutout in the door 12 panel may be provided to receive the illumination assembly 100. Additionally, it is to be recognized that although the description has been directed to front passenger door 12, any other closure panel of vehicle 10 can be equipped with the power door actuation system and illumination assembly 100, including, but not limited to, rear passenger door 15.

Now referring to FIGS. 4A and 4B, in addition to FIG. 1, in accordance with an illustrative embodiment, the window pillar section 110 is covered by a cover plate assembly or applique 104. The illumination assembly 100 is mounted to window pillar section 110 within applique 104 (e.g., on a "dry side", or interior side 103 of the applique 104) as shown in FIG. 3. FIGS. 4A and 4B illustrate a more detailed view of the mounting of the illumination assembly 100 with the applique 104. Illumination assembly 100 is mounted between a structural portion of window pillar section 110 and applique 104. Specifically, the illumination assembly 100 may be attached to the interior side 103 of the applique 104, behind a transparent or semitransparent portion 119 of the applique 104, and proximate or adjacent edge 114 as an example, using adhesive, interference fit with an integrally molded receptacle on the interior side 103, tape, or screws, fasteners, clips, and the like, for example. As an alternative, the illumination assembly 100 could be mounted to front door 12 (e.g. on the rear outer sheet panel of the door 12) in proximity to vehicle door edge door handle 114 (see FIG. 1), in which configuration an aperture in the outer sheet panel of the door 12 is provided to allow light from the LEDs 102 to pass there through. The illumination assembly 100 extends from a first end 120 to a second end 122 and includes a housing 124 made of plastic (e.g., polypropylene) and a cover 126 of clear acrylic attached to the housing 124 to define a compartment. Alternatively, the applique 104 portion aligned with the LEDS 102 may be semi-transparent portion 119 for allowing light from the LEDs 102 to pass there through to be visible external to the vehicle 10 from the front side 105 of the applique 104, while providing some light diffusive properties. In an embodiment, the cover 126 is formed from a portion of the applique 104 which may be transparent or semi-transparent for allowing light from the LEDs 102 to pass there through, diffused, or non-diffused, to be visible external to the vehicle 10. The illumination assembly 100 also includes a wiring connector 128 for attachment to a wiring harness to provide electrical power and communication with the controller 52.

Figure 5E:
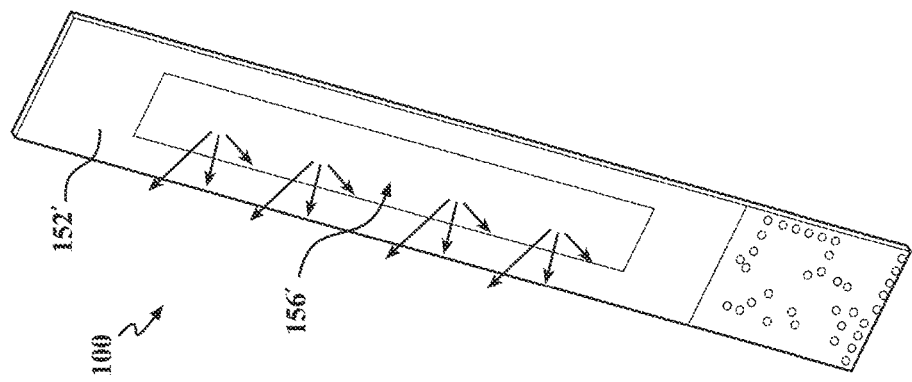
FIGS. 5D and 5E are a rear and front perspective views, respectively, of a PCB having an array of LEDS mounted thereto and having an integrated diffuser, in accordance with an illustrative embodiment.
Figure 5D:
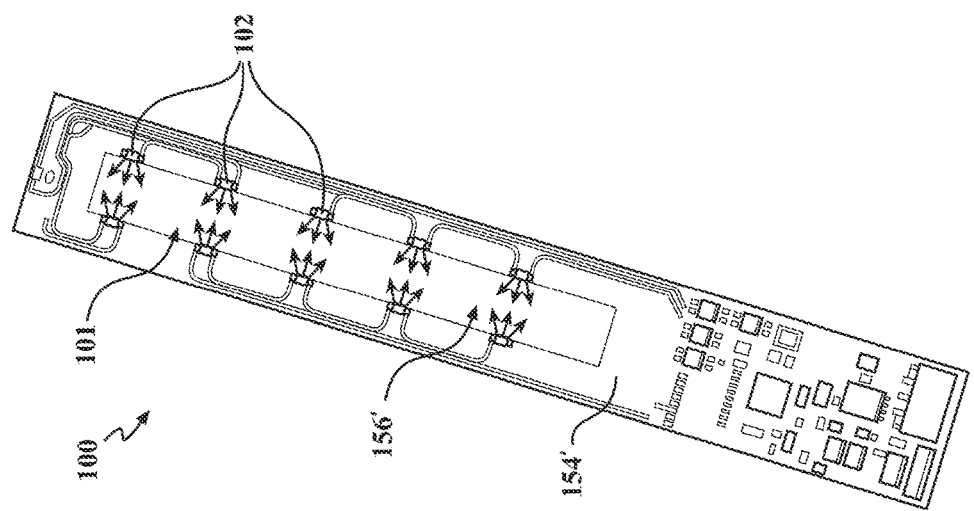
Figure 6:
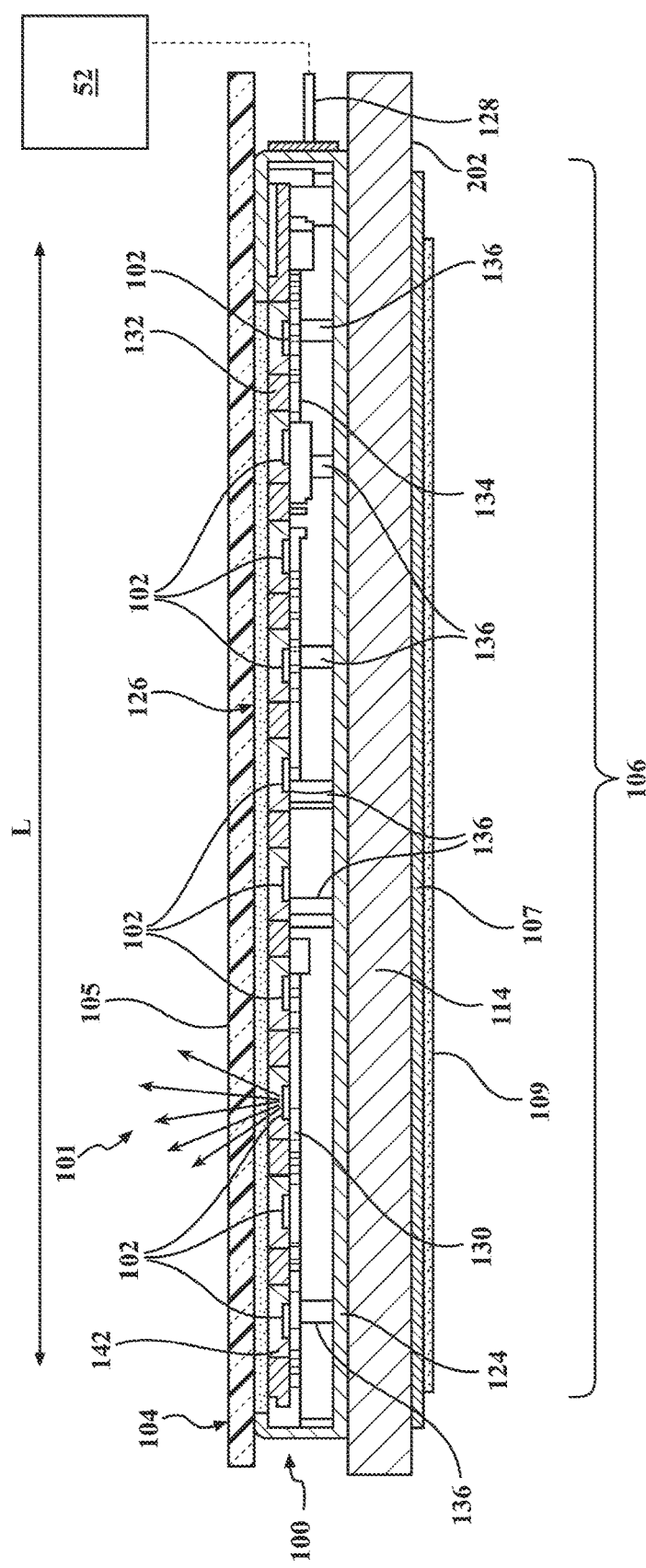
FIG. 6 is a side cross sectional view of the illumination assembly of FIG. 4B taken along the line 6-6, in accordance with an illustrative embodiment.

As best shown in FIG. 6, with reference also to FIG. 5A, the illumination assembly 100 may illustratively include a PCB 130 (printed circuit board) that has a first side 132 facing the cover 126 when assembled therewith, and a second opposite side 134. The PCB 130 is illustratively disposed in the housing 124 and supported therewithin by projecting supports 136 towards the applique 104. The first side 132 and/or the second side 134 of the PCB 130 can have electronic components and the LEDs 102 mounted thereto, such components including a current diver 140 circuitry, and mounting points for wiring connector 128, all of which may be interconnected with electrical traces formed on the PCB 130 surfaces for example. Illustratively, ten LEDs 102 are provided in a linear array of LEDs 102 having a longitudinal length indicated by reference L, as shown in FIG. 6. Other numbers of LEDs 102 may be provided. Four LEDs 102 are illustratively shown in FIG. 5A, while six are illustratively shown in FIG. 3, while five opposing pairs of LEDs 102 are shown in FIGS. 5B and 5D. Other configurations are possible.

Referring to FIG. 4B, 5A and FIG. 6, the cover 126 of the illumination assembly may be at least partially or substantially translucent or transparent and may include optional light directing guides portions 142, or reflectors, provided there below. The light directing guide portions 142 may be provided with light reflecting surfaces 143 and apertures 145, each corresponding to or aligned with one of the LEDs 102 so that light 101 emitted by the LEDs 102 is reflected and optionally diffused and directed by the guide portions 142 and transmitted through the cover panel 126 and toward the applique 104. Optionally, the applique 104 and/or cover 126 may provide a light diffusing effect, or frosting, to diffuse or disperse the emitted light to provide substantially uniform illumination and to limit or substantially preclude bright spots when the LEDs 102 are activated. While light emitted by the LEDs 102 is illustratively shown as emitted in an outboard direction, light may be guided in other directions, such as directed laterally outward towards an edge of the applique 104.

Other configurations of a illumination assembly 100 may be provided, and may include as an example and with reference to FIGS. 5B, 5C, 6A and 6B which illustratively depict a PCB 130' having an integrated diffuser formed in the base layer 150 of the PCB 130'. The PCB 130' further includes a base layer 150 formed between a top layer 152 and a bottom layer 154, either or each of the layers 152, 154 being formed from a conductive layer, which is illustratively made from copper, and also optionally, or alternatively, having a solder mask overlying the copper layer. The base layer 150 is at least partially formed of an optically transparent material. According to an aspect, the base layer 150 can be a semi-transparent glass-reinforced epoxy laminate (e.g., FR4).

As best illustrated in FIGS. 5B and 5C, the PCB 130' includes a plurality of cutouts 156 formed in the top layer 152 and the bottom layer 154, each placed adjacent to one or more of the light emitting devices 102, for forming part of a light channel 158 for channeling light through the base layer 150 of the PCB 130'. The cutouts 156 may define a complete opening or may be comprised of a sheet of material that is thinner than the rest of the PCB 130' and/or more transparent than the rest of the PCB 130' (e.g., the cutouts 156 may extend into a portion of the PCB 130' material). In another embodiment, the cutouts 156 are only formed in the bottom layer 154. At least one light emitting device 102 is disposed on the bottom layer 154 and are aligned with and associated with each of the light channel 158 for selectively illuminating the optically transparent material of the base layer 150. The light emitting devices 102 may be attached e.g. soldered to the PCB 130' and be in electrical communication with a current driver 140 via electrical traces 160 formed on the bottom layer 154. In the illustrative example, the current driver 140 is electrically connected to the wiring connector 128 also mounted on the PCB 130'. It should be appreciated that since the base layer 150 of the PCB 130' is of a semi-transparent material, it serves as an optical diffusor, allowing some light in a diffused pattern to pass there through as emitted by the light emitting devices 102. A microprocessor 164 may be provided on the PCB 130' for controlling any LED 102 activations. FIGS. 5D and 5E shown an alternative embodiment of the lighting assembly 100 except provided with only one longitudinally extending cutout 156' provided on the first top layer 152' and/or bottom layer 154'.

Figure 7:
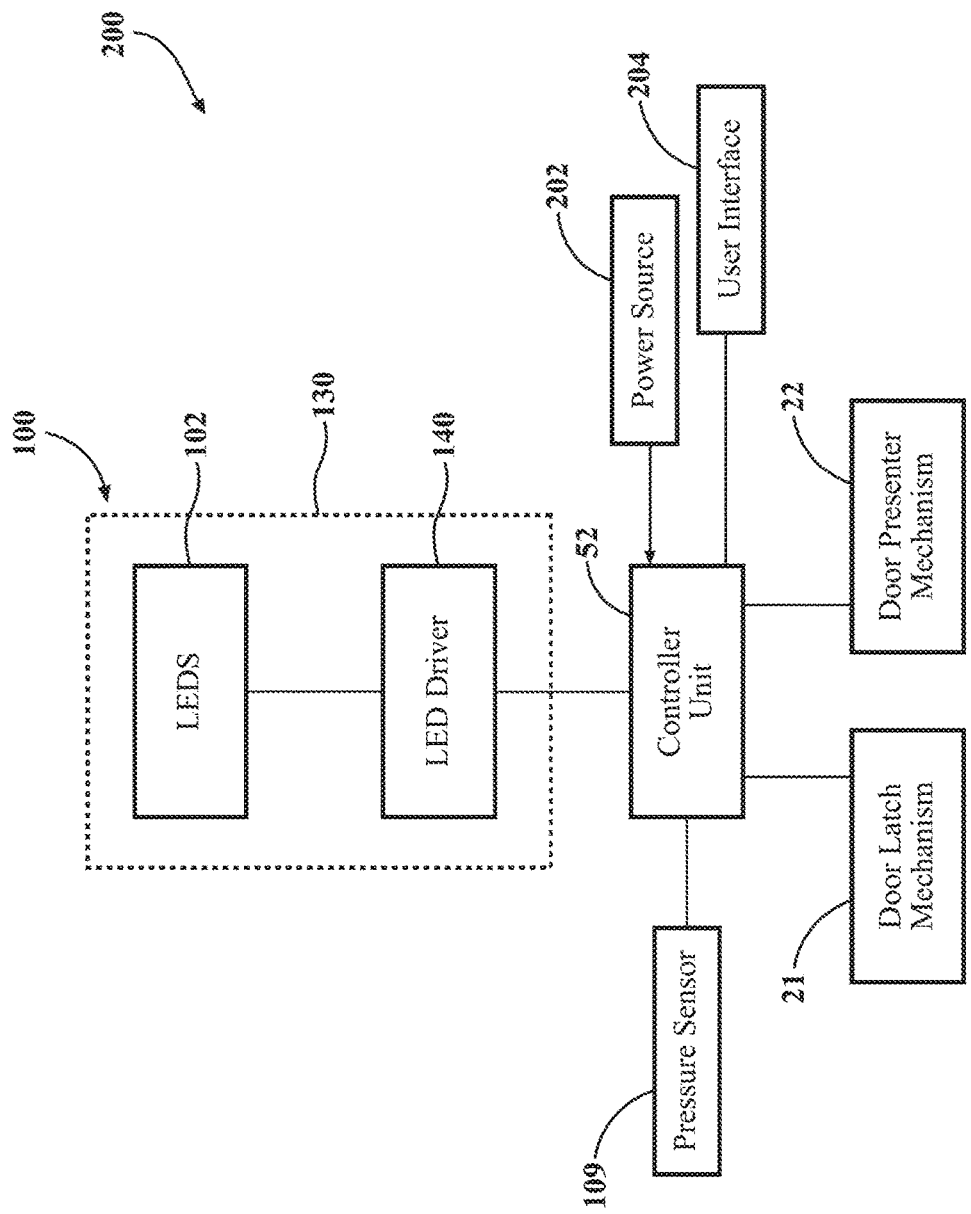
FIG. 7 is block diagram of an illumination system for a handleless door, in accordance with an illustrative embodiment.

Now referring to FIG. 7, there is illustrated an illumination system 200 for identifying the grasping area 106 provided along an inner surface 203 of the vehicle door edge 114 in accordance with an illustrative example. Electronic control module 52 is in electrical connection with a power source or supply power 202, such as a vehicle main battery, to receive power there from. Electronic control module 52 is configured to receive a command signal from a user input device 204, such as Key fob sensor 60 and/or door switch 62, in direct or indirect electrical or wireless communication therewith. Electronic control module 52 is configured to power or actuate the latch assembly 21 and the presenter assembly 22 to allow the door 12 to be moved to the presented position. For example, first the latch assembly 21 is released and then the presenter assembly 22 moves the door 12. Before, during, or after the door 12 has moved to the presented position, electronic control module 52 which is in electrical communication with the illumination assembly 100, is configured to is activate the LEDs 102 either directly by providing current or power to the LEDS 102, or indirectly by controlling the LED current driver 140 and/or command the microprocessor 164 in electrical connection with the LEDs 102 and the electronic control module 52. The LED current driver 140 or electronic control module 52 controls the current driver 140 to provide the desired or selected power level to the LEDs 102 (e.g. night time levels or day time levels), and any desired illumination sequencing e.g. flashing, fading etc.

Now referring to FIG. 8, in accordance with an illustrative operation of the illumination assembly 100, there is provided a method 300 of identifying, and more specifically illuminating, a grasping area 106 of a vehicle door 12. This method 300 illustratively includes the steps of activating a power-operated latch release mechanism of the latch assembly 302 by providing the latch controller 52 with a release command signal using a contact or non-contact unlocking/power release interface (i.e. microswitch, capacitive switch, infrared (IR), IR Time of Flight (TOF), LIDAR, radar, voice activation, FOB, wireless, etc.), such as from user input device 204. Next, the method 300 includes the step of releasing the latch mechanism of the latch assembly in coordination with actuation of a power-operated deployable mechanism of the presenter assembly 304 to move (i.e. present) the door from its unlatched/closed position to a partially-open position, or presented position. Next, the method 300 includes optionally the step of actuating (i.e. power-operated, such as operating power door actuation system 20) or engaging (mechanically-operated) a door check device 306 to provide a door check function for maintaining or holding the door in its presented partially-open position (i.e. to avoid wind or slope based external forces from returning the door to unlatched/closed position or unintentionally moving the door to its fully-opened position to avoid pinching a user's fingers). Next, the method 300 includes the step of, with the door held in its properly presented partially-open position, activating the illumination assembly 308 into an illuminated state to provide an illuminated visual indication that the door is ready to be manually moved to its fully-open position by the user and to identify the grasp area of the door. The step of activating the illumination assembly 308 may include the activation of the illumination assembly after the release command has been received, or changing colors of the illumination assembly, for example from red during movement of the door to green when the door is ready to be manually moved after reaching the present position. Next, the method 300 includes optionally the step of, if the door is not manually moved to its fully-open position within a certain predetermined time period, activating the presenter assembly 310, if the presenter assembly is connected to both the vehicle door and the vehicle body, to return to its non-deployed state for moving the door back to its closed position. If the presenter assembly is not connected to both the vehicle door and the vehicle body, the activating the presenter assembly 310 returns its non-deployed state without returning the door. Note that the illumination assembly can be returned to its non-illuminated state prior to initiation of the power closing operation to notify the user that the door is no longer in a state to be grasped and manually opened.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A closure panel system for a motor vehicle comprising:
a handleless closure panel pivotably mounted to a vehicle body for movement between a closed position and a fully-open position, said handleless closure panel having a grasp area;
a latch assembly mounted to the handleless closure panel and equipped with a latch mechanism and a power-operated latch release mechanism to provide a power release function;
a presenter assembly operably disposed between the vehicle body and the handleless closure panel and equipped with a power-operated presenter mechanism to provide a power open function for moving the handleless closure panel from its closed position to a partially-open position;
an illumination assembly mounted on the handleless closure panel in proximity to the grasp area and having an illumination source operable to provide illumination; and
an electronic control system operable to actuate the power-operated latch release mechanism to release the latch mechanism and shift the latch assembly into an unlatched mode for releasing the handleless closure panel from latched engagement with the vehicle body; actuate the power-operated presenter mechanism to shift the presenter assembly from a non-deployed mode to a deployed mode to move the handleless closure panel from its closed position to its partially-open position; and activate the illumination assembly to an illuminated state to illuminate the grasp area of the handleless closure panel and provide a visual indication to a user that the handleless closure panel is in the partially-open position and ready to be moved to the fully-open position.

2. The closure panel system of claim 1, wherein the electronic control system is configured to deactivate the illumination assembly to a non-illuminated state upon the handleless closure panel remaining in the partially-open position for a predetermined period of time.

3. The closure panel system of claim 2, wherein the electronic control system is configured to actuate the power-operated presenter mechanism to shift the presenter assembly from the deployed mode to the non-deployed mode to move the handleless closure panel from its partially-open position to its closed position after deactivating the illumination assembly to the non-illuminated state.

4. The closure panel system of claim 1, wherein the illumination assembly is incorporated into a portion of the handleless closure panel adjacent an edge of the handleless closure panel.

5. The closure panel system of claim 4, wherein the illumination assembly is incorporated into a window pillar section of the handleless closure panel.

6. The closure panel system of claim 5, wherein the illumination assembly is incorporated into an applique mounted to the window pillar section of the handleless closure panel.

7. The closure panel system of claim 6, wherein the applique is translucent and the illumination assembly is located beneath the applique to backlight the applique.

8. The closure panel system of claim 4, wherein the illumination assembly is incorporated into a portion of the handleless closure panel below a window pillar section of the handleless closure panel.

9. The closure panel system of claim 4, wherein the illumination assembly includes at least one light-emitting diode (LED).

10. The closure panel system of claim 9, wherein the illumination assembly includes a plurality of light-emitting diodes (LEDs).

11. An illumination assembly for a handleless closure panel pivotably mounted to a motor vehicle body for movement between a closed position and a partially-open position via actuation of a power-operated presenter mechanism in response to a signal from an electronic control system to the power-operated presenter mechanism, the illumination assembly comprising:
an illumination source configured to be mounted on the handleless closure panel in proximity to a grasp area of the handleless closure panel; and
where the illumination source is configured to be connected in operable communication with the electronic control system for selective activation to an illuminated state to illuminate the grasp area of the handleless closure panel when the handleless closure panel is in the partially-open position.

12. The illumination assembly of claim 11, wherein the illumination source is configured to be deactivated to a non-illuminated state by the electronic control system upon the handleless closure panel remaining in the partially-open position for a predetermined period of time.

13. The illumination assembly of claim 11, wherein the illumination source is configured to be incorporated into a portion of the handleless closure panel adjacent an edge of the handleless closure panel.

14. The illumination assembly of claim 13, wherein the illumination source is configured to be incorporated into a window pillar section of the handleless closure panel.

15. The illumination assembly of claim 14, further including an applique configured to be mounted to the window pillar section of the handleless closure panel, wherein the illumination source is mounted to the applique.

16. The illumination assembly of claim 15, wherein the applique includes a translucent region and the illumination source is located beneath the translucent region to backlight the applique.

17. The illumination assembly of claim 13, wherein the illumination source is configured to be incorporated into the handleless closure panel below a window pillar section of the handleless closure panel.

18. The illumination assembly of claim 11, wherein the illumination source includes at least one light-emitting diode (LED).

19. The illumination assembly of claim 18, wherein the illumination source includes a plurality of light-emitting diodes (LEDs).

* * * * *